Patented Sept. 17, 1929

1,728,732

UNITED STATES PATENT OFFICE

ALPHONS O. JAEGER, OF PITTSBURGH, PENNSYLVANIA, ASSIGNOR TO THE SELDEN COMPANY, OF PITTSBURGH, PENNSYLVANIA, A CORPORATION OF DELAWARE

BASE-EXCHANGE BODY

No Drawing.   Application filed October 19, 1926.   Serial No. 142,783.

This invention relates to base exchange bodies and to methods of preparing the same.

Base exchange bodies of various types have been prepared in the past for use primarily as water softening means. Among these bodies, the zeolites, which are usually alumino-silicates of the alkali or alkaline earth metals or aluminum double silicates, have been practically the only base exchange bodies which have been investigated.

According to the present invention base exchange bodies are produced by the reaction of three types of components, namely, a soluble silicate, an alkali metal metallate and a heavy metal salt. This is in marked contrast to the ordinary zeolites referred to above which are produced by the reaction of a soluble silicate with a soluble metallate or with a soluble heavy metal salt. The products of the present invention, while resembling zeolites in certain of their physical characteristics, are chemically entirely different substances.

I do not known how the three components combine in the final base exchanging body but I am of the opinion that in most cases a more or less homogeneous chemical compound of high molecular weight is produced. Owing to the insoluble nature of the products, however, it is, of course, impossible to determine their chemical constitution and the present invention is in no sense to be limited to any particular theory of chemical combination. While I believe that in most cases a homogeneous chemical compound is formed, it may be that in some or all of the cases a plurality of chemical compounds may be associated in the form of a zeolite solution or in some other form. The products, however, behave as if they were homogeneous chemical compounds.

While the chemical composition of the new products is not definitely known many of them possess a very remarkable and distinctive physical structure, being highly porous and honeycomb-like, the porosity in most cases being submicronic to a large extent.

The products of the present invention fall into three main types, depending on the relative proportions of the three components. If the metallate and silicate components predominate over the metal salt component the resulting products resemble the aluminosilicate type of zeolite. If the metal salt and silicate components predominate over the metallate component the resulting products have certain resemblances to the aluminum double silicate type of zeolite. Where the metallate and metal salt components predominate over the silicate component the products resemble the non-siliceous base exchange bodies described in my co-pending application, Patent No. 1,694,620, issued Dec. 11, 1928. It should, of course, be understood that there are no sharp lines dividing the different types and one type shades over into the other as the relative proportions of the components are varied.

It is a great advantage of the present invention that despite the fact that the products for the most part behave as if they were homogeneous chemical compounds, nevertheless the proportions of the components and the proportion of the different elements entering into a component where more than one element is present can be varied at will. This may be due to the fact that there are actually present a number of compounds in solid solution or close molecular association or, as I consider more probably, the molecular complex formed is of such enormous size that proportions of the components can be varied without perceptible gradations. The characteristic of the compounds of the present invention, namely, the possibility of incorporating different components in practically any desired proportions, renders the invention particularly suitable for the production of compounds in which a large number of elements must be present in predetermined proportions. Thus, for example, catalysts having any desired proportions of catalytic elements can be obtained by means of the present invention and a vast field of highly effective and accurately tuned catalysts is thereby opened. At the same time catalysts produced by the present invention possess all the advantages of the highly porous honeycomb-like physical structure of the bodies of the present invention and the catalytic elements might be considered as being disseminated throughout the product in a form of molecular subdivision. The structure of the compounds present great mechanical strength and high resistance to temperatures which are normally encountered in catalytic reactions. The invention, however, is in no sense limited to catalysts and is of great importance for the production of base-exchanging bodies, for water purification, gas purification and for many other purposes.

In order to produce bodies having high base-exchanging powers it is desirable to maintain the reactions between the components at all times either alkaline or neutral to phenolphthalein. The products produced by a reaction which does not pass the neutral point are also apparently chemically homogeneous and behave as if they were a single chemical compound. When neutrality to phenolphthalein is past the base exchange power of the products rapidly diminishes but for a considerable region of acidity to phenolphthalein there does not appear to be any far-reaching changes in the physical structure of the bodies produced. I am of the opinion that whenever products are produced by a reaction which is acid to phenalphthalein, a mixture results, there being some of the true-base-exchanging body admixed with a heterogeneous collection of polysilicates. As the acidity increases I believe that the proportion of the base-exchanging bodies continuously decreases which results in lowered base-exchanging power. For catalytic reactions, however, and for some other purposes high base-exchanging powers are not essential and I have found that some products which are produced in a reaction which is acid to phenolphthalein and which may have only feeble base-exchanging powers are nevertheless valuable catalysts for many reactions. Apparently the catalytic efficiency of the bodies of the present invention is due in part to the highly porous honeycomb-like structure and this structure is retained even though the reaction may be quite distinctly acid to phenolphthalein. This invention is therefore not limited in its broadest aspects to products which have been produced in a reaction alkaline or neutral to phenolphthalein and which possess high base-exchanging powers and, on the contrary, also includes products which have been produced in an acid solution so long as they retain any base-exchanging powers. I do not claim in this application any products which do not possess any base-exchanging powers, or processes of making them.

The reaction of the present invention may be carried out in numerous ways. I have found that for most purposes it is desirable to add the metal salt to the metallate and silicate so that at all times the latter two components are in excess and accordingly, the reaction automatically at all times remains alkaline to phenolphthalein. While, however, this preferred method presents numerous advantages in most cases and results in the production of excellent products with a minimum of supervision, other methods of reaction can be used and are included in the invention.

The number of elements which may be included in the products of the present invention is very large. Thus, for example, any of the metal elements which are capable of forming soluble alkali metallates may be used and similarly complex compounds of metals which possess a more or less amphoteric property may be used and for some purposes are of great importance as they permit the production of soluble metallate compounds, whereas the simple oxides of the metals may not be suitable because they do not form soluble alkali metallates. A few among the complex ionogens may be mentioned: ammonia, hydrocyanic acid, sulfocyanic acid, oxalic acid, formic acid, tartaric acid, citric acid, glycerine and various types of sugars.

Certain compounds such as, for example, vanadates, molybdates, tungstates, borates and uranates which are not ordinarily considered as metallates but which are capable of forming base exchange bodies with soluble silicates, are intended to be included under the term "metallate" as used in the present invention. I therefore include under this term any alkali compound of a metal acid which is capable of forming with a soluble silicate a base exchange body or which can be rendered capable of so reacting by a change of valence which can be effected during the reaction. Thus, for example, certain alkali permanganates which are incapable of forming base exchange bodies containing heptavalent manganese may be caused to react with soluble silicates in the presence of suitable reducing agents which reduce the permanganate to a stage of oxidation in which it is capable of behaving as a metallate. Such compounds are included under the classification of metallates for the purposes of the present invention and some very valuable products can be produced by the use of this type of compound. An example of an important element which may be so used is tetravalent vanadium.

The present invention may utilize a single metallate component or a plurality of metallate components in any desired ratio may be used. The following elements are included among the metallates which can be used: aluminum, chromium, zinc, vanadium, beryllium, tin, palladium, ruthenium, rhodium, osmium, platinum, titanium, zirconium, lead, tungsten, boron, molybdenum, uranium and tantalum. Copper, nickel, iron, cobalt, silver, cadmium, manganese, iridium, thorium, yttrium and cerium in the form of their complex compounds may also be used.

The metal salt components are likewise numerous and in general, any water-soluble, acid, neutral or basic salts or any mixtures may be used. The following elements are included among those which form suitable salts: copper, silver, gold, bismuth, beryllium, zinc, boron, aluminum, rare earths, titanium, zirconium, tin, lead, thorium, chromium, uranium, vanadium, manganese, iron, nickel, and cobalt.

The silicate component may be an alkali metal silicate or other silicate which is soluble in alkali or part or all of the silicate component may be substituted in part by alkaline salts of the acids of the following elements: boron, phosphorus, sulfur, nitrogen, tin, titanium, tungsten, chromium, niobium, tantalum, uranium, arsenic, antimony, manganese, etc. All of these compounds are capable of forming base exchange bodies with the other components and are, therefore, to be considered the equivalent of the silicates.

The present invention not only possesses advantages in the wide choice of components but it also permits important economies in the production of certain of the products. Thus, for example, an ordinary artificial zeolite suitable for the softening of water may be prepared by the reaction of sodium aluminate and waterglass. The reaction may be considered empirically as follows:

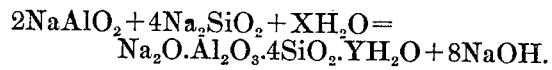
$$2NaAlO_2 + 4Na_2SiO_2 + XH_2O =$$
$$Na_2O.Al_2O_3.4SiO_2.YH_2O + 8NaOH.$$

It will be apparent that the large amount of excess alkali must be removed or neutralized and is entirely wasted. Since the alkali is the most expensive raw material used in producing zeolite the waste alkali represents a comparatively large proportion of the total cost. When, however, as according to the present invention, sodium aluminate, sodium silicate and alumium sulfate are caused to react all of the aluminum sulfate goes into the formation of further amounts of zeolite using the excess alkali to neutralize the sulfuric radical present. Aluminum sulfate is much cheaper than either sodium aluminate or sodium silicate and a much larger yield of base-exchanging body is produced without the use of additional expensive material. In other words, the present invention in all cases utilizes economically the excess alkali which is wasted in the production of ordinary zeolites of the alumino-silicate type. This economy of production of high grade base exchange bodies according to the present invention, is a great economical advantage in such fields as softening of water where the cost of the water softening material used must be kept to a low figure in order to render the process economically satisfactory. This is an added advantage of the present invention.

The choice of the three components of the base exchange body will depend on the use to which the body is to be put. These base exchange bodies may be used for the softening or the purification of water and may also be used for other purposes for which ordinary zeolites are not as suitable. Thus, for example, the wide choice of components coupled with the peculiar physical structure of the base-exchanging bodies render them peculiarly adaptable for use as catalysts and a large number of different catalysts of finely adjustable activity can be prepared according to the present invention and can be used for catalytic processes of all kinds in various forms. In every case, the peculiar physical characteristics of the product, coupled with the mechanical strength of most of the base-exchanging bodies produced, renders them highly efficient and extremely durable as catalysts and the fact that the proportions of the different elements entering into the various components may be varied almost at will makes its possible to produce catalysts having precisely controlled and predetermined activity. This is not possible with numerous composite catalysts in which the components must be present in definite chemical proportions.

While I am of the opinion that probably many of the base exchange bodies prepared according to the present invention may prove to be homogeneous chemical compounds, the molecular size of the compounds, if, in fact, the products are single compounds, appears to be very large, since mixtures of elements of the various components can be used almost without limit and there do not appear to be simple chemical proportions such as would indicate definite compounds of low molecular weight. The products, however, possess remarkable physical homogeneity and whether or not they constitute chemical individuals, the distribution of the various components throughout the bodies appears to be microscopically homogeneous.

The same characteristics of high porosity and wide choice of composition render the products of the present invention excellently suited for the purification of gases, for gas absorption and the separation of gases and particularly for the removal of many contact poisons such as sulfur, arsenic, volatile metal compounds and the like from gases. The new products can also be utilized as insecticides, seed disinfectants, wood-conserving preparations and pigment colors, depending on the choice of components.

The range of the new products is not limited to the elements present in the components which particularly form a non-exchangeable nucleus. On the contrary, it is possible to substitute the alkali metal ions by other metal cations by means of base exchange. Thus, for example, one or more of the following cations may be so introduced: ammonium, copper, silver, gold, beryllium, magnesium, calcium, zinc, strontium, cadmium, barium, mercury, aluminum, thallium, titanium, zirconium, tin, antimony, thorium, vanadium, bismuth, chromium, uranium, manganese, iron, cobalt, nickel, palladium, and platinum. The elements or radicals may be introduced as simple or complex ions or both in any desired proportions. The introduction can be effected simultaneously or successively. The number of possible combinations by means of base exchange is, of course, very great as will be readily apparent to a silicate chemist. The number of new compounds is, therefore, greatly increased and many valuable products, particularly catalysts or activators can be produced by the introduction of suitable base exchange ions which may increase the concentration of catalysts or activators in the product or may result in a more finely tuned catalyst. The increase in catalytic activity which is frequently possible by a suitable introduction of the desired cations by base exchange frequently increases the permissible loading of the product in catalytic processes and may increase the percentage yield which can be obtained thereby or the output or both.

A further series of novel products can be obtained by treating the base exchange bodies of the present invention with compounds containing suitable acid radicals which form with the base exchange bodies salt-like products. While these products may behave in many ways as if they were actual salts, the exact chemical constitution of the products is, of course, not known and the invention is not intended to be limited by any theory as to composition, nor is the expression "salt-like body" to be considered as limited to products which may upon further research turn out not to be true salts, and, on the contrary, it is intended only to designate bodies which behave in many ways as salts.

The production of salt-like bodies of base exchange bodies of the present invention can be effected by treatment with a large number of organic or inorganic acids or some of their salts. Of course, the choice depends upon the use to which the final product is to be put and also on the nature of the base exchange body and the cations which are present therein, since for many purposes, water-insoluble, salt-like bodies are the only ones which can be used. For catalytic and other purposes, acids or salts of the following elements may be used in order to produce salt-like bodies: vanadium, tungsten, uranium, chromium, molybdenum, manganese, tantalum, niobium, antimony, selenium, tellurium, arsenic, phosphorus, bismuth, sulfur, chlorine, platinum, and boron. Simple acids or their salts can be utilized or polyacids, peracids and complex ions may be substituted wherever this is desirable. Other complex anions, such as ferro or ferri cyanogen, sulfo-cyanogen, other metal cyanogens, ammonia complexes and the like are useful wherever they form salt-like bodies with the base exchange bodies with which they are to react. One or more acid radicals may be introduced in the above described manner, either simultaneously or successively, and the amount of acid radicals introduced can be quantitatively varied so that by this means salt-like base exchange bodies having the characteristics of acid neutral or basic acid derivatives can be produced.

The above described salt-like bodies are of importance as catalysts since a number of the acid radicals which can be introduced are of catalytic or activating character and a still further range of catalytic activity, both specific and generic, can be obtained thereby. Since the catalytic chemist is not tied down to definite proportions as with simple chemical compounds of low molecular weight, a large and very varied field of new catalysts is opened to him and many important improvements in certain catalytic processes can thereby be effected.

The base exchange bodies of the present invention while possessing many physical characteristics which resemble those of certain zeolites, are quite different from the zeolites in their behavior and in their chemical constitution. Whether these differences depend on the actual presence of different chemical compounds or on a different arrangement of the molecules I do not know. The bodies of the present invention and for the most part many zeolites are of such complicated constitution that they cannot be definitely classified by quantitative analysis and can only be identified by their method of production and by their physical and chemical characteristics.

The bodies of the present invention are particularly important as catalysts owing to their very desirable physical structure and to the great number of variations possible in the choice of the three components and in the introduction of cations by base exchange and the formation of salt-like bodies with acid radicals. The various components can be catalytically active or activating or mixtures and the same holds true of the cations introduced by base exchange and the anions introduced to form salt-like bodies. The tremendous number of possible products puts in the hands of the catalytic chemist the possibilities of preparing valuable catalysts for a large number of reactions such as reductions, hydrations, dehydrations, hydrogenations, dehydrogenations, oxidations, condensations, polymerizations, depolymerizations, halogenations and the like. Special catalysts for high pressure catalyses, hydrolytic catalysts and products which may act partly as catalysts and partly as absorbents for the purification of gases, removal of contact poisons, carrying out the water gas process, ammonia synthesis, hydrocyanic acid systhesis from carbon monoxides and ammonia, catalytic cracking processes from mineral oils, smokeless combustion, surface combustion, synthesis of methanol and motor fuels, and a large number of other purpoes, are also available.

Among the important catalysts which can be produced according to the present invention are included catalysts for various vapor phase oxidations of organic compounds and particularly aromatic compounds. Many of these reactions require catalysts of extremely finely tuned activity, as in many cases the oxidation is carried out to produce an intermediate product which is frequently unstable and a very finely graded activity of catalyst is of prime importance. The present invention permitting, as it does, the production of catalysts containing catalytic elements in any desired proportion homogeneously united into a siliceous structure of extremely advantageous characteristics such as high porosity and the like, is thus admirably suited for the production of the delicately adjusted catalysts which are of such importance in many oxidations of aromatic compounds.

While the advantageous physical structure of the base exchange bodies of the present invention renders them usable for catalytic and other processes, in the concentrated form it is unnecessary in most cases to use such concentrated products and for many reactions, it is desirable to incorporate the base exchange bodies of the present invention together with their salt-like derivatives and base exchange transformation products with diluents or diluents of various kinds. The number of diluents which can be used either singly or in mixture is, of course, very large and diluents may be inert, catalytically active or activating, either by reason of their chemical composition or their physical structure, such as for example, highly porous diluents which activate by reason of their enormous surface energy. Base exchange bodies of the present invention may be mixed with diluents in various ways or coated onto carrier fragments with or without suitable cements. A very desirable combination of carriers and base exchange bodies is brought about by introducing the carrier during the formation of the base exchange bodies. Products prepared in this way have the great advantage that the carrier and the base exchange body are homogeneously mixed together and form in most cases a microscopically homogeneous, complex body which can be broken into small pieces or retained as fragments and which usually possesses excellent strength and other physical caracteristics.

The method of incorporating and nature of diluents which are to be used has been described in detail in the co-pending application of Alphons O. Jaeger and Johann A. Bertsch, Serial No. 95,771, filed Mar. 18, 1926, where the incorporation of diluents in zeolites is described. While the present products are chemically quite different from zeolites which are prepared from two components, their physical structure is similar and, of course, the methods of precipitation are also clearly analogous. I have found, therefore, that in most cases the same methods of incorporating diluents which have been described in the prior application, above referred to, in connection with zeolites, may be advantageously used for the incorporation of diluents in base exchange bodies of the present invention. As described in the prior application, the diluents may be incorporated into the physical structure of the base exchange bodies or the base exchange bodies can be formed in the interstices of relatively coarser diluents. In both cases, a homogeneous complex is produced. Specific methods of incorporating diluents with base exchange bodies of the present invention will also be described in many of the specific examples which are to follow, it being understood, of course, that the invention is in no sense limited to the details of the examples which are illustrative modifications only.

Base exchange bodies of the present invention can be prepared from concentrated solutions of their components and in some cases, this method is desirable for the production of certain catalysts and particularly insecticidal and fungicidal preparations. For many products, however, I have found that it is advantageous to use relatively dilute solutions of the three initial components and this constitutes one of the preferred modifications of the present invention and will be illustrated in many of the examples.

The precipitation of the base exchange bodies is frequently slow and sometimes incomplete and it is often desirable to accelerate or complete the precipitation by heating, vigorous stirring, or by the addition of acids, either organic or inorganic, in liquid or gaseous form. Thus, for example, hydrochloric acid, sulfuric acid, carbonic acid, nitric acid, acetic acid, formic acid and the like or their acid salts may be used. Ammonium salts and salts of the alkalies as well as halogens, alcohols and other organic substances are frequently advantageous in accelerating precipitation and are included in the scope of the present invention. In some cases, it is advantageous to operate under pressure in autoclaves and the present invention is, therefore, not limited in its broader aspects to operations under any particular pressure.

The important property of porosity of base exchange products of the present invention may in many cases be enhanced by the incorporation with the bodies during formation of products which are readily removable either by volatilization, combustion or by leaching, leaving behind additional pores and thus still further contributing to the permeability of the framework of the base exchange products. The removable products to be used may be inorganic or organic and include a wide number of products and the choice of products will, of course, depend on the characteristics of the base exchange body.

The production of base exchange bodies usually results in a considerable percentage of soluble salts in the reaction mixture and it is generally desirable to wash out these salts and to dry the products preferably at moderate temperatures which may advantageously be below 100° C. Some of the products may contain too little alkali for the purposes for which they are to be used or they may lack mechanical strength. These products may advantageously be washed with a dilute waterglass solution instead of with water with a resulting silification which considerably increases the mechanical strength of the product and may also desirably affect its chemical constitution, particularly by changing its alkalinity or acidity.

Catalytic base exchange bodies for use in many processes require a preliminary treatment with oxidizing, reducing, alkalizing or acidifying agents in the carrier or at elevated temperatures with or without pressure. These products undergo in some cases secondary chemical changes particularly at the surface and are included within the present invention which is in no sense limited to base exchange bodies which have not been subjected to secondary chemical changes. In many cases, particularly where the products are used in certain catalyses, these secondary changes may take place by reason of contact with the reaction components in the catalytic reaction and these products are also included within the scope of the present invention.

The invention will be illustrated in more detail in connection with the following specific examples. Throughout the examples, where the strength of the waterglass solution is not specifically described it should be understood that an ordinary commercial waterglass solution is meant, usually having a strength of about 30° Bé. but which may vary from 25° to 35°. It is generally unimportant to have a waterglass solution of extremely accurately determined concentration and solutions having concentrations which vary throughout fairly wide limits can be satisfactorily used.

Example 1

8–9 mols of $SiO_2$ in the form of a commercial sodium waterglass solution are diluted with 10 to 12 times the amount of water. 1 mol of aluminum sulfate is then dissolved in alkali to form sodium aluminate of as high a concentrated solution as possible and 1 mol of aluminum sulfate is dissolved in water to form a 10–15% solution. The sodium aluminate and waterglass solutions are then mixed together and the aluminum sulfate is added in a thin stream with vigorous stirring at ordinary temperatures of 50–60° C. The total amount of alkali used in the water glass and sodium aluminate solutions should be limited so that after the whole of the aluminum sulfate has been added, the mixture is weakly alkaline or neutral, lying between the neutral points of indicators such as phenolphthalein and methyl orange. The amount of alkali to be used can be readily determined by a sample test.

If the amount of alkali is excessive, it can be partially neutralized after the addition of aluminum sulfate by the careful addition of acids such as for example sulfuric acid or hydrochloric acid in order to bring about the desired degree of alkalinity. An excellent yield of base exchange body containing sodium and aluminum is obtained and the product when pressed, washed and dried below 100° C. possesses excellent base exchange powers. It is excellently suited for the softening and purification of water.

The sodium aluminate can be partly or wholly substituted by one or more of the metallates of zinc, lead, chromium, tin and other amphoteric metals. In the same way, the aluminum sulfate can be wholly or partly substituted by one or more of the salts of the heavy metals such as for example, zinc, lead, chromium, tin, iron, nickel, cobalt, copper, titanium, manganese and silver.

A small amount of sodium phosphate or borax or both can be added to the waterglass solutions and the resulting products will then contain phosphoric acid or boric acid in non-exchangeable form in addition to the silica.

It is frequently desirable to incorporate such water softening and purifying agents as the above described base exchange bodies with suitable diluents or purifying agents. This can best be carried out by adding to one or more of the three initial component solutions, rocks, tuffs, trass of volcanic or eruptive origin, green sand, kieselguhr, manganese dioxide, coke, wood charcoal, activated carbon and the like. The amount of the diluent to be added may vary within wide limits and can best be determined by a preliminary test as the amount will vary somewhat with the nature of the base exchange body and the diluent and in all cases, the amount of diluent should be kept sufficiently low so as to produce granules which are of sufficient mechanical strength and resistant to water.

When an alkaline product is produced, there are usually present alkaline by-products in soluble form and it is frequently advantageous to salt out by means of saturated solutions of sodium chloride, sodium sulfate and the like as these aid in accelerating the precipitation of the alkaline reaction products.

In addition to the uses for the softening and purification of water, the base exchange bodies above described can be also used for certain specific catalyses such as for example dehydrations.

*Example 2*

16 parts of vanadic acid are formed into a slurry with 300 parts of water and are acidified with sulfuric acid. The mixture is then heated to boiling and a vigorous stream of sulfur dioxide is passed through the hot solution. In a short time, a blue solution of vanadyl sulfate is formed. After boiling out the excess sulfur dioxide, the blue solution can be divided into two portions in the ratio of 2:3. 3/5ths of the blue solution are cautiously treated with a concentrated caustic potash solution until a clear brown solution of potassium vanadite is formed. 140 parts of potassium waterglass of 39° Bé. are diluted with 500 parts of water and the potassium vanadite is poured in with vigorous stirring. The mixture is then gently warmed and the remaining 2/5ths of the vanadyl sulfate is added in a thin stream with vigorous agitation, whereupon the mass first solidifies to a gray-green gel and on further stirring is transformed into readily filterable granular aggregates.

The amount of alkali used in the solutions should be chosen so that at the end of the reaction, the mixture remains weakly alkaline to phenolphthalein. If the alkalinity is much greater, the precipitation is delayed but can be accelerated by an addition of about 50 parts of a saturated sodium sulfate solution which increases the coagulating speed and improves the yield. Another method of accelerating precipitation is to reduce the alkalinity by the cautious addition of dilute acids or solutions of acid salts such as for example, hydrochloric acid, sodium bisulfate and the like. By this means, any desired degree of alkalinity or neutrality can be obtained.

The reaction mixture is allowed to stand and is then decanted, pressed and washed with water. The press cake is dried below 100° C. and the base exchange body containing potassium and tetravalent vanadium is then broken into fragments or is hydrated with water, in which case it also breaks into granules. The final product is a light gray hard body having conchoidal fracture and possessing excellent base exchange properties. In a finely divided state, it may be used as an insecticide.

The base exchange body may be heated for a considerable period of time at 400–500° C. in a stream of pyrites burner gases and then becomes a good contact mass for contact sulfuric acid. The catalyst after this preparation is also excellent for the catalytic oxidation of organic bodies, particularly aromatic hydrocarbons.

If it is desired to dilute the base exchange body, one or more of the three initial component solutions, preferably either the waterglass or the potassium vanadite solutions, are mixed with a total from 60–80 parts of cellite, the resulting product being a diluted base exchange body which can be dehydrated in a stream of hot air and after preliminary treatment with acid gas, is an excellent contact mass for vapor phase catalyses such as the oxidation of sulfur dioxide to sulfur trioxide and naphthalene to phthalic anhydride and is also a good catalyst for liquid phase oxidations such as for example the oxidation of hydroquinone to quinone in a nitric acid solution.

The concentrated or diluted base exchange body may be treated by causing a silver nitrate, copper sulfate or copper nitrate solution or a mixture to trickle over it in order to effect base exchange. If, for example, the silver or copper is added in molecular quantities, a base exchange body is obtained which contains copper or silver and tetravalent vanadium or which may contain both copper and silver in case a mixture of the two are used. These base exchange bodies are excellent contact masses for the oxidation of methyl alcohol to formaldehyde.

An insecticidal preparation of excellent strength can be prepared by treating the diluted or undiluted base exchange body containing copper and tetravalent vanadium with a solution of sodium arsenate, forming the arsenate of the copper-vanadyl base exchange body.

*Example 3*

Finely ground pumice meal is impregnated with 10% by weight of copper nitrate in solution and is then given a subsequent treatment with an alkali solution in sufficient quantity to precipitate copper hydroxide in a fine state of division on the pumice meal. The product, after this preliminary treatment, is then stirred into 4 to 6 mols of sodium waterglass which has been suitably diluted with water as described in the foregoing examples to form a suspension. This suspension is then rendered weakly ammoniacal and 1.5 mols of copper in the form of copper ammonium nitrate to form an N/10 solution and 0.25 mol of aluminum in the form of sodium aluminate of as high a concentration as possible are first added. Thereupon, a 10% copper nitrate solution is added in a thin stream, the sodium-aluminum-copper-base exchange body precipitating out at once mixed with the pumice meal impregnated with copper. After the precipitation is ended, the precipitate is pressed, moderately washed and dried out at about 80–100° C., whereupon it is broken into fragments.

In the production of this body, the quantitative relation of the metallate components together with the metal salt components is greater than the alkali silicate, and, therefore, the base exchange body produced does not belong to the alumino silicate or aluminum double silicate type.

The product may be reduced with gases containing hydrogen at 250–300° C. and results in a firm, non-pyrophoric and non-dusting contact mass, which is excellently suited as a catalyst for the reduction of aromatic nitro-compounds to amines with hydrogen or hydrogen containing gases.

Thus, for example, nitrobenzol can be reduced to aniline at 180–260° C. with an almost theoretical yield and in a similar manner, nitronaphthalene to naphthylamine at 300–350° C. The contact mass also serves for the dehydrogenation of cyclohexanol and its homologues, and cyclohexanon and its homologues at about 280–320° C. The same catalyst can also be used for transforming borneol into camphor at 280–300° C. and aldehydes, such as acetaldehyde and crotonaldehyde can be reduced to the corresponding alcohols at 80–180° C. The contact mass can also be used for the chlorination of methane by passing a mixture of methane and chlorine over it at 200–400° C. Excellent commercial reaction products may be obtained.

The product, either with or without reduction, can be used as a chlorination catalyst for the purification of aromatic hydrocarbons such as benzol, toluol and the like when the latter are permitted to trickle over the catalyst in the presence of a counter current of diluted chlorine either at ordinary or at moderately elevated temperatures. The reaction products can be distilled fractionally and yield aromatic hydrocarbons which are free from thiophenes, saturated and unsaturated alifactic compounds and carbon disulfide.

*Example 4*

4 solutions are prepared as follows:
1. 10 mols $SiO_2$ in the form of potassium or sodium waterglass are diluted with 20 parts of water;
2. 1 mol of $Cr_2O_3$ is dissolved in the form of sodium chromite of an N/10 solution;
3. 0.5 mol of vanadyl sulfate is prepared as described in Example 2;
4. 4 mols of $SiO_2$ in the form of ordinary waterglass are stirred with 1.2 mol of potassium permanganate in an N/2 solution and sufficient sugar to form a 15% solution is added to reduce the permanganate to $MnO_2$.

The mixture is then stirred and dilute acetic acid is cautiously added drop by drop until the mixture is weakly acid to litmus. A dark-brown gel precipitates out which consists of a hydro gel of silicic acid with colloidal manganese dioxide. Solution 1 is poured into the gel with vigorous agitation and solution 2 is incorporated with activated charcoal which has first been treated with sodium phosphate and heated to 300° C. in a stream of ammonia. Suspensions 1 and 2 are then poured together and stirred and solution #3 is permitted to flow in, resulting in the precipitation of a brown gelatinous mass. The agitation is maintained for a short time and preferably the mixture is warmed to 60–70° C. in order to render the gelatinous mass readily filterable. The mass is then pressed and thoroughly washed with an ammonium carbonate solution followed by a short rinsing with water. The product is an ammonium-sodium chromium-vanadyl base exchange body in which hydrated silicic acid and manganese dioxide as well as activated carbon impregnated with phosphate is present in an exceedingly finely divided state.

The mass is dried, broken into fragments and constitutes an excellent absorbing agent to remove certain hydrocarbons and volatile organic metal compounds from gases and mixtures of gases in the presence or absence of small amounts of halogen and oxygen. Sulfur compounds of all kinds, both organic and inorganic, and other impurities are either directly absorbed or are subjected to far reaching decompositions by the oxidizing or halogenizing gases, being usually transformed into a form in which they are easily removed. The product is analogous to an alumino-silicate since the proportions of the three components are such that the alkali silicate and the metallate exceed the metal salt components.

*Example 5*

12–16 mols of $SiO_2$ in the form of a waterglass solution are diluted with 30 parts of water and finely divided iron oxide is stirred in until the suspension just remains readily stirrable. The iron oxide may advantageously be prepared by blowing a stream of oxygen over glowing iron and grinding the iron scale in a ball mill.

After warming the waterglass iron oxide suspension, an aqueous solution as highly concentrated as possible containing 0.5 mol potassium tungstate, 0.5 mol potassium molybdate, and 0.5 mol potassium vanadate is stirred in. To the product thus produced, a mixture of 0.5 mol of aluminum nitrate in the form of an N/4 solution and 0.5 mol of thorium nitrate in the form of an N/4 solution in water are added with vigorous agitation, whereupon the whole mass solidifies to a gel. If necessary, the speed of gelatinization may be increased by a cautious addition of a little dilute nitric acid. The gel is pressed, dried and washed with ammonia water and the resulting product is a base exchange body containing tungsten, molybdenum, vanadium, aluminum and thorium in non-exchangeable form and being diluted with iron oxide in a very finely divided and loosely distributed state.

The base exchange body is then treated by permitting a dilute cerium nitrate solution to trickle over it in order to effect base exchange. Thereupon the product is dried and reduced with hydrogen at 300–400° C. and constitutes an excellent contact mass for the synthesis of ammonia from hydrogen and nitrogen under high pressure.

Example 6

The following components are prepared:
1. 20 parts of pulverized siderite are thoroughly mixed with 4 parts of pulverized titanium dioxide. 24 parts of kieselguhr are impregnated with a 5% copper nitrate solution, dried and mixed thoroughly with the siderite $TiO_2$ mixture;
2. 30 parts of 39° Bé. waterglass are diluted with an equal amount of water;
3. 1.5 parts of chromium in the form of a chromium nitrate solution as highly concentrated as possible are treated with sufficient caustic soda of as high a concentration as possible to dissolve up the hydroxide at first precipitated;
4. 0.5 parts of chromium in as high a concentrated solution as possible in the form of a chromium nitrate solution are mixed with a solution containing 0.5 parts of aluminum in the form of as high a concentrated solution as possible of aluminum nitrate.

Mixtures 2 and 3 are mixed and are impregnated into the powder 1, whereupon the whole is treated with solution #4. A moist pulverulent mass is produced and solidified by the subsequent reaction which produces the base exchange body and forms both a catalyst, activator and cement. The mass is formed into granules, thoroughly dried and calcined and is an excellent catalyst for producing hydrogen and carbon dioxide by the water gas process according to the equation:

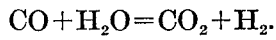

$$CO + H_2O = CO_2 + H_2.$$

During the process at the reaction temperature of about 500° C., the siderite gives up its carbon dioxide and results in a still further increase in the porosity of the product and a correspondingly enhanced catalytic activity.

Example 7

The following component mixtures are produced:
1. 6 mols of $SiO_2$ in the form of a 2N ammoniacal waterglass solution are stirred with precipitated pyrolusite to form a thin paste;
2. 1 mol of aluminum oxide is dissolved in caustic alkali to form sodium aluminate of a normal solution;
3. 1 mol of copper oxide is dissolved in aqueous ammonia to form an N/10 solution of cuprammonium oxide;
4. 1 mol of zinc oxide is dissolved in caustic alkali to form a normal solution;
5. 1 mol of zinc nitrate is dissolved in water to form an N/5 solution;
6. 1 mol of chromium nitrate is dissolved in water to form an N/5 solution.

Mixtures 1, 2, 3 and 4 are poured together and solutions 5 and 6 are mixed and poured into the mixture with vigorous agitation, the whole solidifying to a blue-green gel, which is pressed and dried below 100° C. After drying, the product is hydrated by permitting water to trickle over it and constitutes a base exchange body which contains besides $SiO_2$-aluminum, copper, zinc and chromium in a non-exchangeable form and which is further diluted with finely divided pyrolusite. This product is an excellent catalyst for the cracking of crude petroleum and possesses the advantage that it has but little tendency to cause carbonization and can easily be regenerated by means of steam. The product contains an excess of metallate and metal salt over the silicate component.

Example 8

Three mixtures are prepared as follows:
1. 7–9 mols of $SiO_2$ in the form of a potassium sodium waterglass solution diluted with 20 volumes of water are mixed with kieselguhr or pumice meal until a suspension is obtained which is just stirrable;
2. 1 mol of $V_2O_5$ is dissolved in caustic potash or caustic soda solution to form potassium or sodium vanadate of as high a concentration as possible;
3. 1 mol of $V_2O_5$ is reduced with sulfur dioxide in aqueous suspension to form blue vanadyl sulfate in solution, the excess $SO_2$ being removed by boiling, as explained in Example 4.

Mixtures 1 and 2 are poured together and solution 3 is permitted to flow in with vigorous agitation, taking care that the solution remains at least neutral to litmus or slightly alkaline even after the whole of solution 3 has been added. The alkalinity can be adjusted by slight addition of alkali to the mixture of 1 and 2.

A dirty gray-blue gel results which is filtered with suction, washed with a little water and then dried and constitutes a base exchange body containing tetravalent and pentavalent vanadium in non-exchangeable form and having kieselguhr or pumice meal finely distributed throughout its framework. After a short preliminary treatment at 400–500° C. with 7% burner gases, the product becomes an excellent catalyst for the oxidation of sulfur dioxide to sulfur trioxide.

The same contact mass is also well suited for many catalytic organic oxidations, such as for example, the oxidation of methyl alcohol to formaldehyde; benzol, toluol, phenol, cresol and phthalic anhydride to maleic acid; naphthalene to alphanaphthaquinone and phthalic anhydride; anthracene to anthraquinone; acenaphthene to acenaphthaquinone and naphthalic anhydride, phenanthrene to phenanthraquinone and diphenic acid; cresol to salicilic acid; fluorene to fluorenone; toluol, chlortoluol and the like to corresponding aldehydes and acids; ethyl alcohol to acetaldehyde or acetic acid, and other alcohols to corresponding aldehydes and acids; ethylene chlorhydrine to chloracetic acid; eugenol to vanillin or vanillic acid, etc.

A still finer adjustment of the catalyst for the various reactions can be effected by exchanging part or all of the exchangeable alkali for other cations such as for example copper, silver, iron, cobalt, aluminum, rubidium, and nickel. A further improvement in some of the reactions can be effected by forming salt-like bodies of the base exchange body with acids of the elements of the fifth and sixth groups of the periodic system such as vanadium, tantalum, bismuth, chromium, molybdenum, tungsten and uranium.

Solution #2 can be substituted by an equal amount of an alkali vanadite which can be produced by treating vanadyl sulfate with caustic soda or caustic potash until a brown solution is formed and base exchange products may thereby be produced which are highly effective as oxidation catalysts. For some specific catalytic oxidations, it is desirable to substitute part or all of the alkali metal vanadite component by alkali metal salts of the acids of tantalum, molybdenum, tungsten, uranium, bismuth or chromium.

The kieselguhr which is stirred into the waterglass solution #1 may also advantageously be impregnated with salts of the oxyacids of iron, copper, nickel, silver, cobalt, aluminum and lead or by vanadates, molybdates, tungstates, chromates, tantalates, bismuthates, uranates, etc., which may advantageously be produced in a nascent state in the pores of the kieselguhr. This treatment of the kieselguhr diluent increases the catalytic effectiveness of the catalyst for the contact sulfuric acid process and for many organic oxidation processes such as the oxidation of anthracene to anthraquinone, naphthalene to phthalic anhydride, etc.

Example 9

Three mixtures are prepared as follows:
1. 7–9 mols of $SiO_2$ in the form of a potassium or sodium water glass solution diluted with 6 to 8 volumes of water are mixed with pulverized quartz, pumice meal or kieselguhr until the suspension remains just stirrable;
2. 1 mol of $V_2O_5$ is reduced in a hot aqueous suspension to a blue vanadyl sulfate solution by means of sulfur dioxide and is then transformed into a brown solution of potassium vanadite by treatment with sufficient concentrated caustic potash solution, in the manner explained in Example 2;
3. Ferrous sulfate is dissolved to form a 10% aqueous solution or a similar solution of ferric chloride may be used.

Mixtures 1 and 2 are mixed together and then sufficient of the ferrous sulfate solution is added with vigorous agitation to bring the reaction mixture to neutrality to phenolphthalein or methyl orange or to a point which is just on the alkaline side. The mass solidifies to a dirty brown gel which is filtered with suction, slightly washed and dried, constituting a diluted base exchange body which contains vanadium and iron in a non-exchangeable form. If ferric chloride solution is used instead of ferrous sulfate solution a gray-brown gel is obtained.

Solution #2 can be substituted in part or in whole by an alkali metal vanadate solution. In this case, a dirty greenish-brown gel is produced with ferrous sulfate, while ferric chloride gives a yellow gel.

The base exchange bodies dried and prepared as usual are treated with burner gases at 400–500° C. and constitute excellent catalysts for contact sulfuric acid. They are also excellent catalysts for many organic oxidations such as those described in Example 8.

The iron salts may be substituted by salts of other metals such as for example copper sulfate, nickel sulfate, cobalt sulfate, aluminum sulfate and the like. The bodies can also be changed by base exchange or by the formation of salt-like bodies, as described in Example 8, and these changes are frequently desirable as in many cases they render the catalysts more resistant to high temperatures.

Example 10

1. 14–16 mols of a diluted waterglass solution are mixed with 300–400 parts of kieselguhr or pulverized quartz sufficiently diluted to get stirrable product;
2. 1 mol of zinc nitrate is dissolved in the smallest possible amount of caustic potash to form as highly concentrated solution of potassium zincate as possible.
3. 1 mol of chromium oxide is dissolved to form as highly concentrated solution of potassium chromite as possible;
4. 0.25 mol of lead nitrate is dissolved in the form of potassium plumbite, of as high a concentration as possible;
5. 1 mol of zinc nitrate is dissolved in water to form an N/10 solution;
6. 1 mol of cadmium nitrate is dissolved in water to form an N/10 solution.

Mixtures 1, 2, 3 and 4 are combined and a mixture of the solutions 5 and 6 are poured in with vigorous agitation, whereupon the mass solidifies to a gel which is separated by pressing from the mother liquor in the usual manner, thoroughly washed and dried. After drying, it is hydrated with water and again dried.

If the base exchange body is treated at 300–450° C. with a water gas mixture under about 50–200 atmospheres pressure, methyl alcohol, higher alcohols and ketones are produced, particularly when the mixture is rich in carbon monoxide. A larger yield of methyl alcohol may be produced under the same reaction conditions by exchanging the potassium in the base exchange body for cerium and manganese in equal parts, which can be effected by treatment with a solution containing equal parts of cerium nitrate and manganese nitrate. A still better yield of methyl alcohol can be obtained by treating the body which contains exchangeable manganese and cerium with an ammonium chromate solution in order to produce a salt-like body.

Example 11

11–13 mols of $SiO_2$ in the form of potassium waterglass are diluted with 7–10 times the amount of water, rendered slightly ammoniacal, whereupon 250 parts of very finely divided pure zinc spar are stirred in. A solution containing 1 mol of potassium chromite in the form of an N/2 solution and 1 mol of cuprammonium nitrate in the form of an N/10 solution is added with stirring and finally 1 mol of copper in the form of a 10% copper nitrate solution is poured in, whereupon the mass becomes gelatinous. The base exchange body is subjected to an intense subsequent treatment with a magnesium nitrate solution, throughly washed and dried and constitutes a magnesium-chrome-copper base exchange body diluted with zinc spar. When this body is reduced with hydrogen containing gases at 200° C., it becomes an excellent catalyst for the production of methanol from carbon dioxide and hydrogen at about 250–350° C. at high pressures and particularly when a cyclic process is used. Higher alcohols together with methyl alcohol are produced if the magnesum is exchanged for copper.

Example 12

6–8 mols of $SiO_2$ in the form of a diluted waterglass solution are treated with 0.5 mol potassium chromite in the form of a 10% solution or sodium chromite in solution and a 10% ferrous nitrate solution is permitted to run in with vigorous agitation until the mixture becomes neutral to phenolphthalein. A gelatinous mass is formed and is separated as usual, constituting a potassium-chromium-ferrous base exchange body which can be reduced in a stream of hydrogen at 300° C., either with or without exchange of the alkali metal for an alkaline earth metal. After reduction, the product is an excellent reduction catalyst and can be used to produce volatile hydrocarbons of a petroleum-like character and excellently suited as fuels by passing purified water gas over the contact mass under a high pressure and at 300–450° C. The exchange of alkali metal for alkaline earth metal takes place slowly, and usually incompletely, and the degree may be varied depending on the product desired. The proportions of the components are such that the metal salt and silicate are in excess over the metallate and the bodies are, therefore, somewhat analogous to the aluminum double silicates.

Example 13

The following mixtures are prepared:
1. 12–16 mols of $SiO_2$ in the form of a waterglass solution are mixed with 0.25 mol of sodium tungstate in the form of as high a concentrated solution as possible and 0.3 mol of sodium molybdate of as high a concentration as possible and about 1 mol of pulverized titanium dioxide is stirred in;
2. 1 mol of $V_2O_4$ is dissolved in caustic potash to form a 5% solution of potassium vanadite;
3. 1 mol of potassium chromite is dissolved in water to form a solution of maximum concentration;
4. A 10% potassium aluminate solution containing 1 mol of $Al_2O_3$ is prepared;
5. 1 mol of thorium nitrate is dissolved to form a 10% solution.

Mixtures 1, 2 and 3 are combined and a mixture of the solutions 4 and 5 is run in with vigorous agitation. Care should be taken that the reaction remains neutral to phenolphthalein or slightly alkaline. A gelatinous mass forms at once and is separated in the usual manner, constituting an alkali metal-aluminium-vanadyl-chromium-thorium-$SiO_2$-tungstic acid-molybdic acid-base exchange body containing in homogeneous subdivision within its framework titanium dioxide in a finely divided state.

The base exchange body is an excellent contact mass for the synthesis of hydrocyanic acid from ammonia and carbon monoxide and the efficiency of the catalyst can be still further increased by the exchange of the alkali for rare earths, earth metals or manganese. A still better contact mass results when the base exchange body described in Example 6 is incorporated in the catalyst either after or during formation of the latter.

Example 14

The following mixtures are prepared:
1. 14–16 mols of $SiO_2$ in the form of a potassium waterglass solution are diluted with 7–8 parts of water;
2. 1 mol of beryllium oxide is dissolved as sodium beryllate in the form of a 10% solution;

3. 1 mol of zinc is dissolved as sodium zincate in the form of a 10% solution;

4. A 10% solution containing 1 mol of thorium nitrate is prepared;

5. A 10% aqueous solution containing 1 mol of zirconium nitrate is prepared.

Mixtures 1, 2 and 3 are poured together and solutions 4 and 5 are then added, precipitating a base exchange body, the reaction being maintained continuously alkaline. The gelatinous mass is separated by filtration with suction and dried.

When acetaldehyde vapors are slowly passed through a deep layer of the above described base exchange body at an elevated temperature, an excellent yield of aldol and crotonaldehyde are obtained. Similar aldolizations and crotonizations can be carried out with these catalysts either in the vapor phase or in the liquid phase.

Example 15

The following mixtures are prepared:

1. 7-8 mols of $SiO_2$ in the form of sodium waterglass are diluted with 20 times the amount of water and an equal mixture of lignite and hydrated $SiO_2$ is stirred in until the mixture just remains readily stirrable;

2. 1 mol of sodium chromite is dissolved in water to form a 5% solution;

3. 1 mol of chromium nitrate is dissolved in water to form a 15% solution.

1 and 2 are mixed together and 3 is then added, precipitating out a greenish-black gelatinous mass which is pressed, washed and dried as usual and treated by trickling a considerable amount of ammonium carbonate solution over the product, exchanging the alkali metal for ammonia.

The base exchange body thus obtained diluted with coke and silica is an excellent mass for gas purification, being capable of freeing gases from sulfur in organic or inorganic form and from volatile metal compounds. A slight addition of halogen or oxygen to the gases to be purified is frequently advantageous.

Example 16

The following mixtures are prepared:

1. 8-9 mols of $SiO_2$ in the form of a diluted sodium waterglass solution are mixed with a sufficient amount of kieselguhr so that the mixture just remains readily stirrable;

2. 1 mol of $Al_2O_3$ is dissolved in the form of a 10% solution of sodium aluminate;

3. 0.75 mol $Al_2O_3$ is dissolved as a 10% solution of aluminum sulfate and about 250 parts calcium arsenate are stirred in.

Mixtures 1 and 2 are combined and 3 is added, precipitating out a gelatinous mass which after being suitably separated and treated is subjected to after treatment with a mercuric chloride solution, exchanging most of the sodium for mercury. The product produced when finely ground and mixed with solid sodium chloride or incorporated in a solution of this salt and sprayed onto plants, acts as an efficient and durable insecticide.

This insecticide possesses the great advantage that when sprayed onto plants and subjected to contact with moisture as a result of dew or rain the sodium chloride dissolves and reacts with the base exchange body, replacing the mercury by base exchange. The mercury thus replaced is present throughout the mass in a substantial molecular subdivision and therefore in a correspondingly extremely active form. Similar valuable insecticides can be prepared by mixing the insecticidal base exchange bodies with salt.

Example 17

8-9 mols of $SiO_2$ in the form of a diluted sodium waterglass are mixed with 500 parts of ferric oxide and 50 parts of monazite sand refuse, the suspension remaining just stirrable, whereupon 1 mol of a sodium aluminate of as concentrated a solution as possible is stirred in. This mixture is then treated with about 0.5 mol of copper nitrate of as high a concentrated solution as possible and 0.5 mol of as highly a concentrated solution as possible of chromium nitrate, resulting in the precipitation of a base exchange body which is separated and washed in the usual manner and is then treated with a solution of a soluble calcium salt in order to exchange the sodium for calcium. The body when dried and broken into fragments or when formed into granules is an excellent catalyst for surface combustion or for the combustion of smoke from high volatile coals.

In the claims the expressions "soluble silicate component", "soluble metallate component" and "soluble metal salt component" are intended to cover respectively a single soluble silicate, a single soluble metallate, a single soluble metal salt or a plurality of any of the products and the claims are in no sense limited to products in which only a single soluble silicate, a single soluble metallate and a single soluble metal salt are caused to react with each other.

The expression "physically homogeneous" as applied to products of the present invention is not intended to be limited to which products are throughout microscopically homogeneous but includes products such as diluted base exchange bodies, where the finely divided diluents are distributed homogeneously through the base exchange body and the whole forms a homogeneous aggregate, although it may be possible to identify the individual diluent particles under a microcope.

What is claimed as new is:

1. A zeolite body containing a reaction product of at least one soluble silicate, at least one soluble metallate and at least one salt the basic radical of which contains a metal capable of entering the non-exchangeable nucleus of a zeolite.

2. A zeolite body containing a reaction product of at least one soluble silicate, at least one soluble metallate and at least one salt the basic radical of which contains a metal capable of entering the non-exchangeable nucleus of a zeolite, the reaction having been maintained non-acid to phenolphthalein.

3. A physically homogeneous product containing a zeolite which is the reaction product of at least one soluble silicate, at least one metallate and at least one salt the basic radical of which contains a metal capable of forming part of the non-exchangeable nucleus of a zeolite, the product being diluted with diluent bodies which form with the zeolite a physically homogeneous structure.

4. A physically homogeneous product containing a zeolite which is the reaction product of at least one soluble silicate, at least one metallate and at least one salt the basic radical of which contains a metal capable of forming part of the non-exchangeable nucleus of a zeolite, the product being diluted with diluent bodies which form with the zeolite a physically homogeneous structure, the zeolite having been formed in a reaction maintained non-acid to phenolphthalein.

5. A zeolite body containing a reaction product of at least one soluble silicate, at least one salt of a metalloid acid radical capable of entering into the non-exchangeable nucleus of a zeolite, at least one metallate and at least one salt the basic radical of which contains a metal capable of entering into the non-exchangeable nucleus of a zeolite.

6. A zeolite body according to claim 1, in which the zeolite reaction product has been caused to react after formation with a compound containing an acid radical to form therewith a salt like body.

7. A diluted zeolite body according to claim 3, in which the zeolite reaction product has been caused to react after formation with a compound containing an acid radical to form therewith a salt like body.

8. A zeolite body according to claim 1, in which at least one of the components of the non-exchangeable nucleus is catalytically active.

9. A zeolite body according to claim 3, in which at least one of the components of the non-exchangeable nucleus is catalytically active.

10. A zeolite body according to claim 1, in which at least one of the components of the non-exchangeable nucleus is catalytically active, and which body contains an exchangeable base other than an alkali metal, which enhances the catalytic power of the product.

11. A zeolite body according to claim 1, in which the zeolite after formation has been caused to react with a compound containing a catalytically active acid radical to form with the zeolite a salt like body.

12. A zeolite body according to claim 3, in which the zeolite after formation has been caused to react with a compound containing a catalytically active acid radical to form with the zeolite a salt like body.

13. A zeolite body according to claim 3, in which at least one diluent is catalytically active.

14. A zeolite body according to claim 3, in which at least one diluent is a catalytically inert body impregnated with catalytically active material.

15. A zeolite body according to claim 1, in which at least one of the components of the non-exchangeable nucleus contains an element of the 5th or 6th group of the periodic system.

16. A zeolite body according to claim 1, in which at least one of the components of the non-exchangeable nucleus of the zeolite contains vanadium.

17. A method of producing a zeolite body, which comprises bringing about reaction between at least one soluble silicate, at least one soluble metallate and at least one salt the basic radical of which contains an element capable of entering into the non-exchangeable nucleus of a zeolite, the process being carried out so that when reaction is completed the reaction mixture is alkaline to litmus.

18. A method of producing a zeolite body, which comprises bringing about reaction between at least one soluble silicate, at least one soluble metallate and at least one salt the basic radical of which contains an element capable of entering into the non-exchangeable nucleus of a zeolite, the process being carried out so that when reaction is completed the reaction mixture is non-acid to phenolphthalein.

19. A method of producing a zeolite body, which comprises bringing about reaction between at least one soluble silicate, at least one metallate and at least one salt the basic radical of which contains a metal capable of entering into the non-exchangeable nucleus of a zeolite, the relatively acid components being added to the relatively more alkaline components to maintain throughout the reaction a mixture which is non-acid to phenolphthalein.

20. A method of producing a diluted zeolite body, which comprises bringing about reaction between solutions of at least one soluble silicate, at least one metallate and at least one salt basic radical of which contains a metal capable of entering into the non-exchangeable nucleus of a zeolite, at least one of the solutions having thoroughly admixed therewith diluents.

21. A method according to claim 17, in which at least one of the components other than the silicate component is present in the form of a complex compound of a metal.

22. A method according to claim 17, in which at least one of the non-silicate components is introduced in a form in which the metal is in a stage of oxidation different from that desired in the final product, and sufficient reagent is introduced into the reaction mixture to effect the desired change in oxidation during reaction.

23. A method of producing a zeolite body, which comprises bringing about reaction between at least one soluble silicate, at least one metallate and at least one salt the basic radical of which contains a metal capable of entering into the non-exchangeable nucleus of a zeolite and, after formation of the zeolite, causing it to react with a compound containing an acid radical capable of reacting with the zeolite to form a salt like body.

24. A method of producing a base exchange body, which comprises bringing about reaction between at least one soluble silicate, at least one metallate and at least one salt the basic radical of which contains a metal capable of entering into the non-exchangeable nucleus of a zeolite, and subjecting the final product to surface silicification by treatment with a soluble silicate, followed by drying.

Signed at Pittsburgh, Pennsylvania, this 13th day of October, 1926.

ALPHONS O. JAEGER.